Patented Oct. 18, 1938

2,133,340

UNITED STATES PATENT OFFICE 2,133,340

ACYLAMINO PHTHALOCYANINE

Berthold Bienert, Leverkusen I. G. Werk, Germany, assignor to General Aniline Works, Inc., New York, N. Y., a corporation of Delaware No Drawing. Application September 3, 1936, Serial No. 99,269. In Germany September 6, 1935

2 Claims. (Cl. 260—314)

The present invention relates to a new class of acylamino phthalocyanine pigments.

Phthalocyanines represent a new class of pigment dyestuffs which can be prepared in various ways, f. i. by heating an o-dihalogen-benzene or an o-halogen-nitrile of the benzene series with cuprous cyanide or by heating o-dinitriles of the benzene series with copper or copper salts. The compounds which are obtainable according to the said processes are characterized by having chemically combined copper. In a similar manner phthalocyanines containing other polyvalent metals than copper can be prepared. Also metal free phthalocyanines have been prepared either by removing from the phthalocyanines those metals which are relatively loosely bound, such as magnesium, or by heating o-dinitriles of the benzene series with an alkali metal alcoholate followed by a hydrolysis of the alkali metal compound thus formed. Phthalocyanines which are derived from o-dihalogen benzenes, o-halogen nitriles of the benzene series or o-dinitriles of the benzene series are for brevity's sake in the following designated as "phthalocyanines of the benzene series".

Most of the hitherto known phthalocyanines show clear blue shades and part of them are characterized by their excellent fastness properties. As far as within the phthalocyanine series products of green coloration have been obtained, they are either relatively dull in shades or show insufficient fastness properties. It is, therefore, a problem to prepare phthalocyanines which combine a clear green shade with the fastness properties of f. i. a copper phthalocyanine of the benzene series.

The present invention is based upon the discovery that the presence of acylamino groups in the benzene nuclei effects a change in shade from blue to green or greenish blue. In accordance therewith my invention is concerned with phthalocyanines of the benzene series containing acylamino groups in the benzene nuclei. As follows from the above, all compounds of the character described are within the scope of my invention, regardless as to whether they have been prepared by a process starting from o-dihalogen benzenes or from o-halogen nitriles of the benzene series wherein the benzene nuclei contain acylamino groups, or whether the acylamino groups have been subsequently introduced into ready prepared phthalocyanines, or whether these compounds have been prepared in any other way.

The new phthalocyanines which contain acylamino groups can be prepared in the following manner: As starting material o-dinitriles of the benzene series are used which have as substituent an amino group wherein a hydrogen atom is substituted by the radical of an aliphatic or aromatic acid, f. i. by acetyl, butyryl, propionyl, benzoyl, methyl benzoyl, methoxy benzoyl, etc. Of course, there may also be used as starting materials such compounds of the benzene series which contain an acylamino group and which are suitable to be transformed into o-dinitrile compounds during the reaction, as o-halogen nitriles and o-dihalogen benzenes. The transformation of these starting materials into phthalocyanines takes place in the usual ways, f. i. by heating the o-dinitriles with metals or metal yielding agents, such as copper, nickel, cobalt respectively their salts, if necessary in the presence of a suitable solvent, as pyridine, quinoline, or benzophenone, the special working conditions being stated in the following examples.

The acylamino phthalocyanines obtained by the said processes show green to green blue shades. Owing to their fastness to light, water and spirit they can be excellently used as pigment dyestuffs, f. i. for graphic wall paper printing and for coloring artificial silk. If necessary the dyestuffs can be sulfonated in the usual manner and the sulfonic acids converted into lakes.

In the new acylamino phthalocyanines the acyl radical can be split off f. i. by the action of concentrated sulfuric acid of about 95%. The amino phthalocyanines thereby obtained yield with acids blue salts which color turns to a dull green by treatment with an alkali. The amino phthalocyanines can be diazotized by suspending the same in an acid medium and adding thereto sodium nitrite in the usual manner, the diazo compounds thereby formed being in general green substances.

The following examples illustrate the invention, the parts being by weight.

Example 1

A mixture of 108 parts of quinoline, 36 parts of 5-acetyl-amino-2-bromobenzonitrile (prepared from 2-bromobenzonitrile by nitration, reduction and acetylation) 16 parts of cuprous cyanide and 30 parts of cuprous bromide is boiled 30-40 minutes. The mixture is diluted with 100 parts of pyridine, the precipitate formed is filtered with suction and washed with pyridine and alcohol. The reaction product is then extracted with cold diluted hydrochloric acid, and for the purpose of further purification it is extracted with hot pyridine.

A dark green, amorphous powder is obtained which is stable against $H_2SO_4$-monohydrate at a temperature of about 10° C. If pasted, an intensive green shade is obtained which does not change with alkali. The dyestuff obtained shows an excellent fastness to light.

Example 2

If the 5-acetylamino-2-bromobenzonitrile of Example 1 is substituted by the corresponding quantity of 5-benzoylamino-2-bromobenzonitrile likewise a clear green pigment dyestuff is obtained the color of which does not turn with alkali.

Example 3

135 parts of quinoline, 27 parts of 4-acetylaminophthalonitrile prepared from 4-nitro-phthalonitrile by reduction and acetylation and 27 parts of anhydrous nickel chloride are heated half an hour at 180° C. After this the mixture is diluted with 135 parts of pyridine, the precipitate is filtered with suction and washed with pyridine and alcohol. For further purification the reaction product is extracted with hot pyridine. A dull green pigment dyestuff is obtained.

Example 4

If the nickel chloride of Example 3 is substituted by anhydrous cobalt chloride and the reaction product is heated nearly one hour at 200–210° C. a bluish green dyestuff results which yields with hydrosulfite and diluted caustic soda lye a yellowish green vat.

Example 5

Sulfonation of the tetraacetylamino-(4)-copper phthalocyanine: 25 parts of sulfuric acid monohydrate, 25 parts of oleum of 20% strength and 5 parts of tetraacetylamino-(4)-copper phthalocyanine are heated about one hour at 85–90° C. until the reaction product is soluble in diluted aqueous soda lye, whereby the acetylamino group is saponified. This product dissolves in water with a blue shade. In order to reintroduce the acyl radicals which have been split off during the sulfonation process the product is heated with 10 parts of acetic acid anhydride while stirring for one hour at 50° C.

The reaction product is isolated by pouring the reaction mixture into a mixture of 100 parts of an aqueous sodium chloride solution and 500 parts of ice; the precipitate thus formed is filtered with suction, and washed until neutral with 5 parts of a sodium chloride solution.

The sulfonic acid obtained as described above can be used for the preparation of lakes and for coloring paper; it dissolves in water with green and after vatting with hydrosulfite and soda lye with blue shades.

I claim:

1. A metal phthalocyanine of the benzene series wherein each benzene nucleus contains an acylamino radical, the acyl being selected from the group consisting of lower alkacyl, benzoyl, methyl-benzoyl and methoxy-benzoyl.

2. A symmetrical copper phthalocyanine of the benzene series wherein each benzene nucleus contains an acylamino radical, the acyl being selected from the group consisting of lower alkacyl, benzoyl, methyl-benzoyl and methoxy-benzoyl.

BERTHOLD BIENERT.